(12) United States Patent
Song et al.

(10) Patent No.: US 8,793,265 B2
(45) Date of Patent: Jul. 29, 2014

(54) METHOD AND SYSTEM FOR SELECTING PERSONALIZED SEARCH ENGINES FOR ACCESSING INFORMATION

(75) Inventors: Yu Song, Pleasanton, CA (US); Doreen Cheng, San Jose, CA (US); Alan Messer, Los Gatos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 649 days.

(21) Appl. No.: 11/900,525

(22) Filed: Sep. 12, 2007

(65) Prior Publication Data
US 2009/0070318 A1    Mar. 12, 2009

(51) Int. Cl.
*G06F 7/00*   (2006.01)
*G06F 17/30*  (2006.01)

(52) U.S. Cl.
CPC .................... *G06F 17/30867* (2013.01)
USPC .......................................... 707/758

(58) Field of Classification Search
None
See application file for complete search history.

(56) References Cited

U.S. PATENT DOCUMENTS

| | | | |
|---|---|---|---|
| 6,327,590 B1 * | 12/2001 | Chidlovskii et al. | 707/5 |
| 6,711,569 B1 * | 3/2004 | Bushee | 1/1 |
| 7,860,895 B1 | 12/2010 | Scofield et al. | |
| 8,046,351 B2 * | 10/2011 | Song et al. | 707/710 |
| 2002/0069194 A1 * | 6/2002 | Robbins | 707/3 |
| 2005/0086204 A1 * | 4/2005 | Coiera et al. | 707/3 |
| 2006/0287988 A1 * | 12/2006 | Mason | 707/3 |
| 2006/0288001 A1 * | 12/2006 | Costa et al. | 707/5 |
| 2007/0233672 A1 * | 10/2007 | Sanfacon et al. | 707/5 |
| 2007/0250500 A1 * | 10/2007 | Ismalon | 707/5 |
| 2008/0033926 A1 * | 2/2008 | Matthews et al. | 707/4 |
| 2008/0114786 A1 | 5/2008 | Nir et al. | |
| 2008/0201304 A1 * | 8/2008 | Sue | 707/3 |
| 2008/0201317 A1 | 8/2008 | Sue | |
| 2009/0055388 A1 | 2/2009 | Song et al. | |
| 2009/0132527 A1 * | 5/2009 | Sheshagiri et al. | 707/5 |

OTHER PUBLICATIONS

Howe et al., Savvysearch: A Metasearch Engine That Learns Which Search Engines to Query, AI Magazine, vol. 18, No. 2, Summer 1997.*
Seth, S. et al, "Eureka! Your own search engine has landed!", The Official Google Blog, Oct. 23, 2006, pp. 1-5, http://googleblog.blogspot.com/2006/10/eureka-your-own-search-engine-has.html.
http://www.webmd.com/, Webmd.com, downloaded Jan. 30, 2008, pp. 1-2, United States.
U.S. Non-final Office Action for U.S. Appl. No. 11/895,124 mailed on Jan. 7, 2010, United States.
U.S. Final Office Action for U.S. Appl. No. 11/895,124 mailed on Sep. 22, 2010, United States.

* cited by examiner

*Primary Examiner* — Jay Morrison
(74) *Attorney, Agent, or Firm* — Kenneth L. Sherman, Esq.; Michael Zarrabian, Esq.; Sherman & Zarrabian LLP

(57) ABSTRACT

A method and system for selecting personalized search engines for accessing information is provided. Each personalized search engine represents one or more base search engines. Characteristic information, representing searching capabilities of each of the multiple personalized search engines is obtained. A personalized search engine is selected among the multiple personalized search engines for executing a query based on said characteristic information and the query.

55 Claims, 7 Drawing Sheets

10

METHOD AND SYSTEM FOR SELECTING PERSONALIZED SEARCH ENGINES FOR ACCESSING INFORMATION

FIELD OF THE INVENTION

The present invention relates to providing access to electronic information, and in particular to providing access to information using search engines over the Internet.

BACKGROUND OF THE INVENTION

With the proliferation of information available on the Internet and the World Wide Web (the Web), many users utilize the Web for access to desired information. However, conventional approaches to seeking information on the Web are tedious and ineffective. One approach involves using a meta search engine, where a user generates search queries for the meta search engine to send to multiple predefined Internet search engines. This limits the scope of the search to the predefined Internet search engines, and is not focused on selecting specialized search engines that are likely to provide information relevant to the queries.

Another approach involves using a vertical search engine for a specialized search in a specific information domain (e.g., a vertical search engine for all health related information). A related approach involves a user selecting among a set of vertical search engines. These require the user to have knowledge of available vertical search engine capabilities, and to provide keywords that suit searching capabilities of such search engines. Other approaches determine search engine capabilities using information describing the search engines for selecting search engines. However, such approaches are limited to the type and amount of information describing search engines.

Further, many vertical search engines do not provide a programmatic search interface (e.g., search API). Instead, their interfaces are designed with HTML pages. As such, automatically filling-in fields on search engine pages using keywords is not possible without understanding precisely the semantics of the query keywords and the forms on the web pages.

BRIEF SUMMARY OF THE INVENTION

The present invention provides a method and system for selecting personalized search engines for accessing information. Each personalized search engine represents one or more base search engines for performing searches. One embodiment involves obtaining characteristic information representing the searching capabilities of each one of multiple personalized search engines, and selecting a personalized search engine among the multiple personalized search engines for executing a query based on said characteristic information and the query.

Obtaining the characteristic information for a personalized search engine may include determining characteristic keywords from search results retrieved by that personalized search engine through its base search engines.

Selecting a personalized search engine may include determining a similarity between the query and the characteristic information for each personalized search engine, and selecting a personalized search engine based on the similarities such that a personalized search engine with the highest similarity is selected for executing the query and returning search results.

The search results may be analyzed for quality based on the query and/or the characteristic information, and the selected personalized search engine is scored based on quality of the search results for the query and/or the characteristic information. The scores are then used in determining a similarity between the query and the characteristic information for each personalized search engine.

These and other features, aspects and advantages of the present invention will become understood with reference to the following description, appended claims and accompanying figures.

DETAILED DESCRIPTION OF THE INVENTION

The present invention provides a method and system for access to information using search engines. An appropriate search engine for a given query is dynamically selected, which increases the search result relevance and reduces the need for user involvement in search engine selection. In one embodiment, the present invention enables searching for information by dynamic selection of personalized search engines based on a query. A personalized search engine is dynamically selected based on a query, and the query (e.g., in free text) is dispatched to a selected personal search engine.

Such personalized search engines are offered by, e.g., Yahoo.com, Google.com, etc., and provide a user the opportunity to create a personal search engine. The user can choose one or more base search engines for a personalized search engine to perform searches in response to queries. For example, a user can create "my wine search" search engine, which includes Wine.com as a base search engine for performing searches. A personalized search engine can accept queries as free text, and the user can include any sites that are related to a search domain.

Several example implementations of the present invention are described below. As noted, each personalized search engine represents one or more base search engines. Characteristic information, such as keywords that represent the searching capabilities of each one of multiple personalized search engines, is obtained. Then, a personalized search engine is selected for executing a query based on said characteristic information and the query.

Obtaining the characteristic information for each personalized search engine includes determining the characteristic information based on search results retrieved by that search engine through its base search engines. Obtaining characteristic information for each personalized search engine further involves determining characteristic keywords representing searching capabilities of the base search engines of that search engine.

Selecting a personalized search engine then involves determining a similarity between the query and the characteristic information for each personalized search engine, and selecting a personalized search engine based on the similarities such that a personalized search engine with the highest similarity is selected for executing the query and returning search results. The search results are analyzed for quality based on the query and/or the characteristic information, and the selected personalized search engine is scored based on quality of the search results for the query and/or the characteristic information. The scores are used in determining a similarity between the query and the characteristic information for each personalized search engine.

Figure 1:
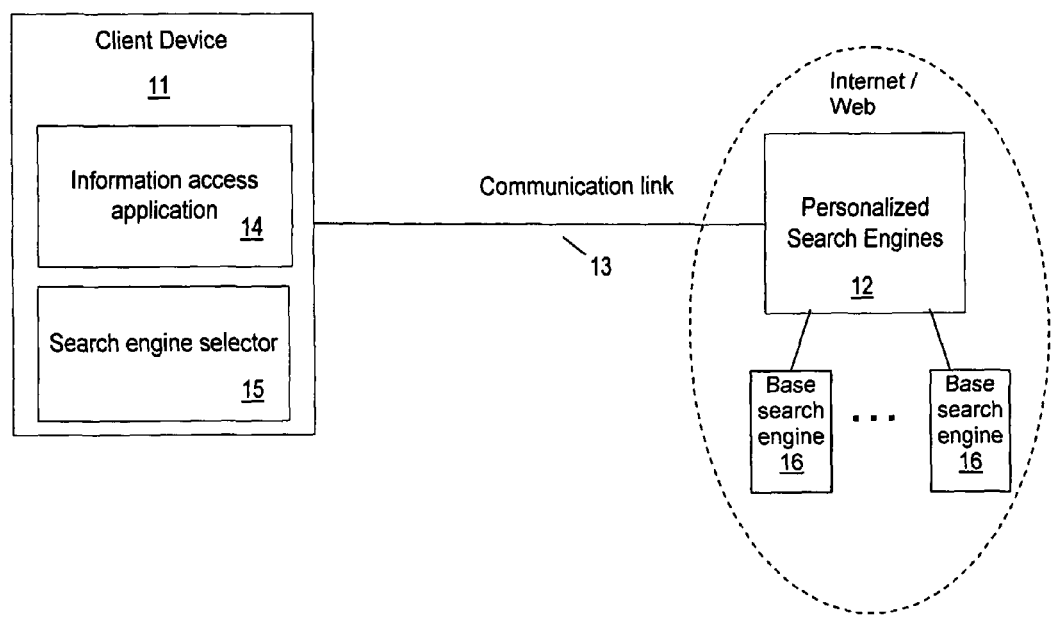
FIG. 1 shows a functional block diagram of an information access architecture, according to an embodiment of the present invention.

FIG. 1 shows a functional block diagram of an information access architecture 10, according to an embodiment of the present invention. A client device 11, such as a personal computer (PC), consumer electronics (CE) device, etc., has access to personalized search engines (servers) 12 via a communication link 13 such as the Internet. Each personalized search engine 12 represents one or more base search engines 16. The client device 11 implements an information access application such as a Web browser 14 and a search engine selector 15 for selecting among the search engines.

Below an example process is described for creating a personalized search engine, and characterizing the personalized search engine with keywords. The personalized search engine represents (utilizes) one or more base search engines 16 which may include existing vertical search engines such as, e.g., Shopping.com. The user creates a keyword list for each base search engine 16 represented by a personalized search engine (e.g., keywords, "computer, camera, camcorder, price, cheap" for the base search engine Shopping.com). According to the present invention, such keywords are utilized as characteristic keywords for the personalized search engine. The characteristic keywords are used in selecting an appropriate personalized search engine for executing a query for access to information.

For example, creating a personalized search engine on Google.com can include: (1) creating an account on Google.com, (2) logging into the Google.com, (3) navigating to the "My Account" page and selecting the "Co-op" link, and (4) creating a personalized search engine by providing requested information on a presented page, including URLs for base engine to utilize for searching, descriptions and keywords for base engines, wherein as noted the keywords are used as characteristic keywords for the created personalized search engine.

Figure 2:
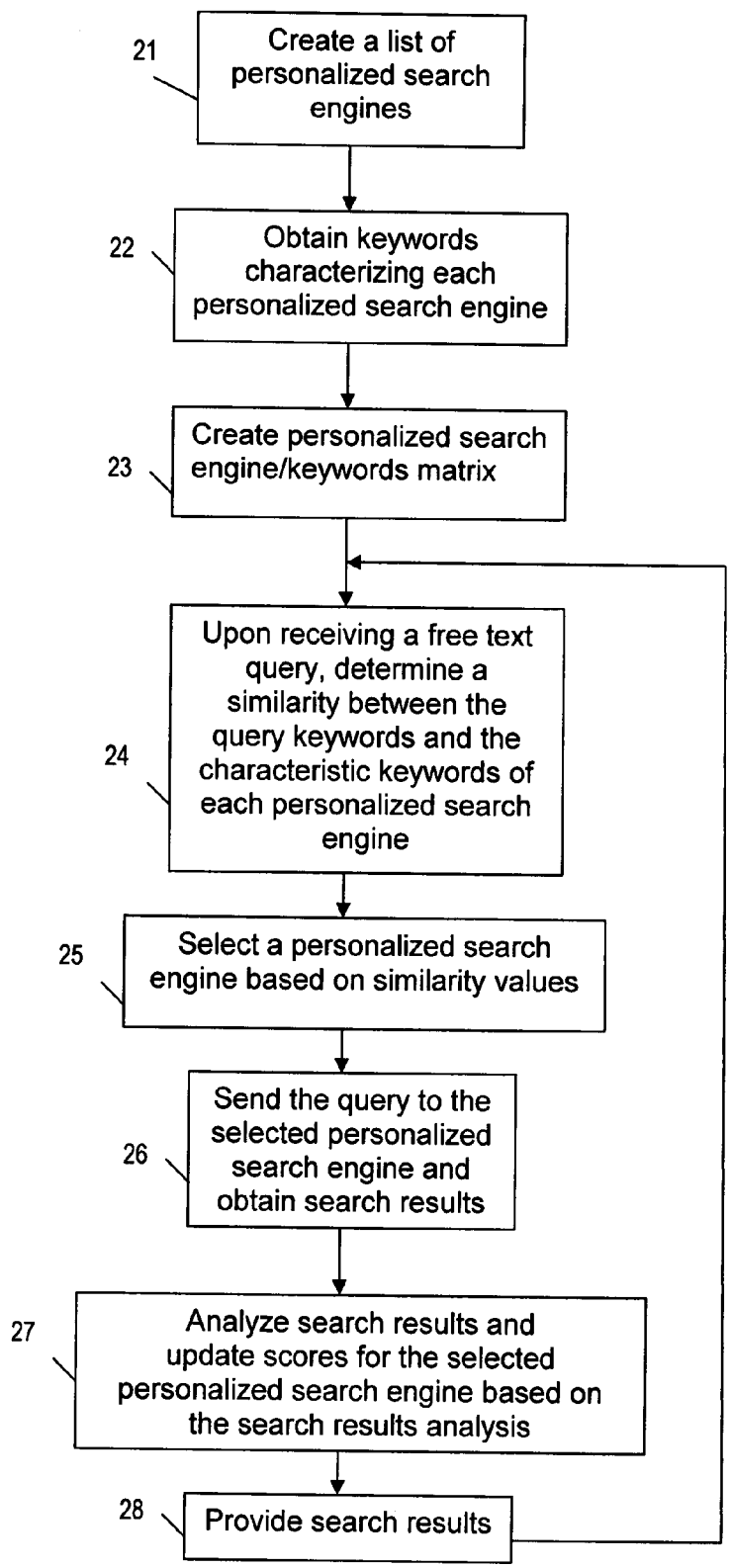
FIG. 2 shows an implementation of a process for selecting a personalized search engine and executing a query for access to information, according to an embodiment of the present invention.

FIG. 2 shows an information access process 20 which implements personalized search engine selection for executing queries, according to an embodiment of the present invention. The process 20 includes the following overall steps:

Step 21: Generating a list of personalized search engines under consideration. This list includes a list of user's personalized search engine. The list can also include other personal search engines created by other users, and need not limit the personal search to a single personalized search engine provider. As such, the list can include personalized search engines from multiple search engine providers. For example, a list of personalized search engines may include entries such as "my wine information", "my vehicle search", etc., wherein the entry "my wine information" on the list is serviced by a personalized search engine from Google.com, and the entry "my vehicle search" on the list is serviced by a personalized search engine from Yahoo.com, etc.

Step 22: Obtaining (creating) characteristic keywords to characterize search capabilities of each personalized search engine under consideration. The characteristic keywords of a personalized search engine describe the domain information of the base search engines represented (utilized) by the personalized search engine. For example, the keywords "new car", "used car", "CPO", provided by a user while creating a personalized search engine as "my vehicle search," can be used as characteristic keywords for the personalized search engine entry "my vehicle search" on said list of personalized search engines. Generally, the characteristic keywords for a personalized search engine can be generated from the descriptions and keywords that a user provides to a provider of personalized search engines and/or from the base engine web sites (URLs) that the user includes in the personalized search engine for searching.

Step 23: Creating a personalized search engine/keyword matrix including entries for a set of characteristic keywords per personalized search engine on said list. The matrix entries accumulate scores for characteristic keywords per personalized search engine over multiple searches, wherein the scores that are used in selecting a personalized search engine for executing a query (described further below).

Step 24: Upon receiving a query such as a free text query, determining a similarity between the query keywords and the characteristic keywords of each personalized search engine using the scores. For example, "car appraisal" is a free text query. Essentially, any query that a user types in the search engine web page can be a free text query Step 25: Selecting a personalized search engine that has the highest similarity value.

Step 26: Sending the query to the selected personalized search engine via the communication link for executing the query through the base search engines represented by the selected personalized search engine, and providing search results.

Step 27: Analyzing the search results and generating/updating scores in the personalized search engine/keywords matrix.

Step 28: Providing the search results to the information access application in response to the query.

In step 22 above, there are several options for a user to associate a set of keywords for personalized search engines. For example, the user can manually create the keywords, and associate the keywords with a personalized search engine. In another example, a base search engine contains a FAQ/about page that contains the capability of the search engine. The user can extract the keywords from those pages for a personalized search engine. The personalized search engines may also be based on search engines created by other users which may already contain keywords about the base search engines. For example, http://www.google.com/coop/cse/examples/ Enthusiasts contains a set of personal search engines with keywords.

Accordingly, for each personalized search engine, an initial list of characteristic keywords is selected to represent the characteristics of each personalized search engine. As such, each personalized search engine has a corresponding set of characteristic keywords that represent the searching capabilities of that personalized search engine.

A score is given to each characteristic keyword for that personalized search engine. Then, given a query that includes keywords, a similarity value between the query keywords and the characteristic keywords for each personalized search engine is computed. The scores are used to calculate the similarity between each personalized search engine's characteristic keywords and the query keywords, in order to select a personalized search engine for executing the query.

For example, a personalized search engine A has associated characteristic keywords "San Jose" with a score 0.1 and "Restaurant" with a score 0.9, and another personalized search engine B has associated characteristic keywords "San Jose" with a score 0.8 and "Restaurant" with a score 0.3. Then, for a query "San Jose French Restaurant Options," an example similarity computation for each personalized search engine adds the score for each keyword together, such that personalized search engine A would have a similarity value 0.1+0.9=1.0 for that query, while the personalized search engine B would have a similarity value 0.8+0.3=1.1 for that same query. Another example of the similarity computation using the scores is a cosine-based similarity computation. Other similarity computation schemes based on the scores can also be used.

The computed similarity values are then used for selecting among the personalized search engines. In the above example, the personalized search engine B which has the highest computed similarity value for the query, is selected as the personalized search engine for executing the query.

When a personalized search engine is selected, the query is provided to the selected personalized search engine for execution through the base engines utilize by the selected personalized search engine. The search results from the personalized search engine are provided in response to the query.

The search results are also used to update the scores for the selected personalized search engine. For example, the top few search results returned by the personalized search engine are then analyzed to determine the quality of the search results based on the query (the quality of the search results can be defined based on relevance to the query, etc.).

The personalized search engine characteristic keywords are a list of keywords that describe the topics of search domains that a personalized search engine can best serve utilizing is base search engines. For example, base search CNN.com can be described using, but not limited to the following characteristic keywords: "news, world, U.S., political, economy, headline" and etc.

The personalized search engine characteristic keywords can be created in various ways. For example, the characteristic keywords can be created manually by a person who is knowledgeable about which keywords best characterize a particular search engine. In another example, the characteristic keywords can be created semi-automatically by first automatically extracting keywords from description of a base search engine. For instance, the FAQ or about page of the base search engine Travelocity.com, at URL http://svc.travelocity.com/about/main/0,TRAVELOCITY:EN|ABOUT PRODSERV,00.html, can be used to extract characteristic keywords for Travelocity.com base search engine). The extracted keywords from the above URL can then be manually selected and edited to ensure the quality of characterization by the selected keyword. In yet another example, the characteristic keywords can be created by using a set of queries focusing on a particular topic for execution by a personalized search engine through its base search engines, analyzing the search results and then optionally selecting keywords by a human expert for the personalized search engine.

For example, for characterizing a personalized search engine that uses the base search engine Webmd.com, a first variety of queries are selected for diseases, medical information, drug information, etc. Those queries are then executed on Webmd.com by the personalized search engine to retrieve results, and a domain expert on health-related fields selects those crucial keywords that can best describe the search capabilities of Webmd.com for the personalized search engine in terms of focus, breadth, etc. In another example, "kidney disease syndrome" can be used as a query to retrieve results from a personalized search engine that utilizes base search engines Webmed.com and Health.com. Then keywords about kidney related health information are extracted from the search results from base search engines Webmed.com and Health.com, wherein the extracted keywords can be used as characteristic keywords for the personalized search engine that utilizes base search engines Webmed.com and Health.com.

In another example, the query "kidney disease syndrome transplant biopsy" can be executed on a personalized search engine that utilizes base search engines Webmd.com and Google.com. In this example, "transplant" and "biopsy" may be characteristics keywords of the base search engine Webmd.com while they are not for the base search engine Google.com. This is because these two words are more domain specific to health and disease while Google.com is a general-purpose search engine that is not specific to the field of health. Other approaches for obtaining characteristic keywords for a personalized search engine are also possible.

Each obtained characteristic keyword for a personalized search engine is given an initial score that is later updated in an iterative process based on the quality of the search results the personalized search engine provides for that characteristic keyword (e.g., high/increasing score for high quality search results and low/decreasing score for low quality search results, etc.). For example, the initial score for each keyword can be 1 to indicate that the keywords have a strong match for the characteristics of the selected search engine. The scores are updated based on additional searches as described below.

Figure 3:
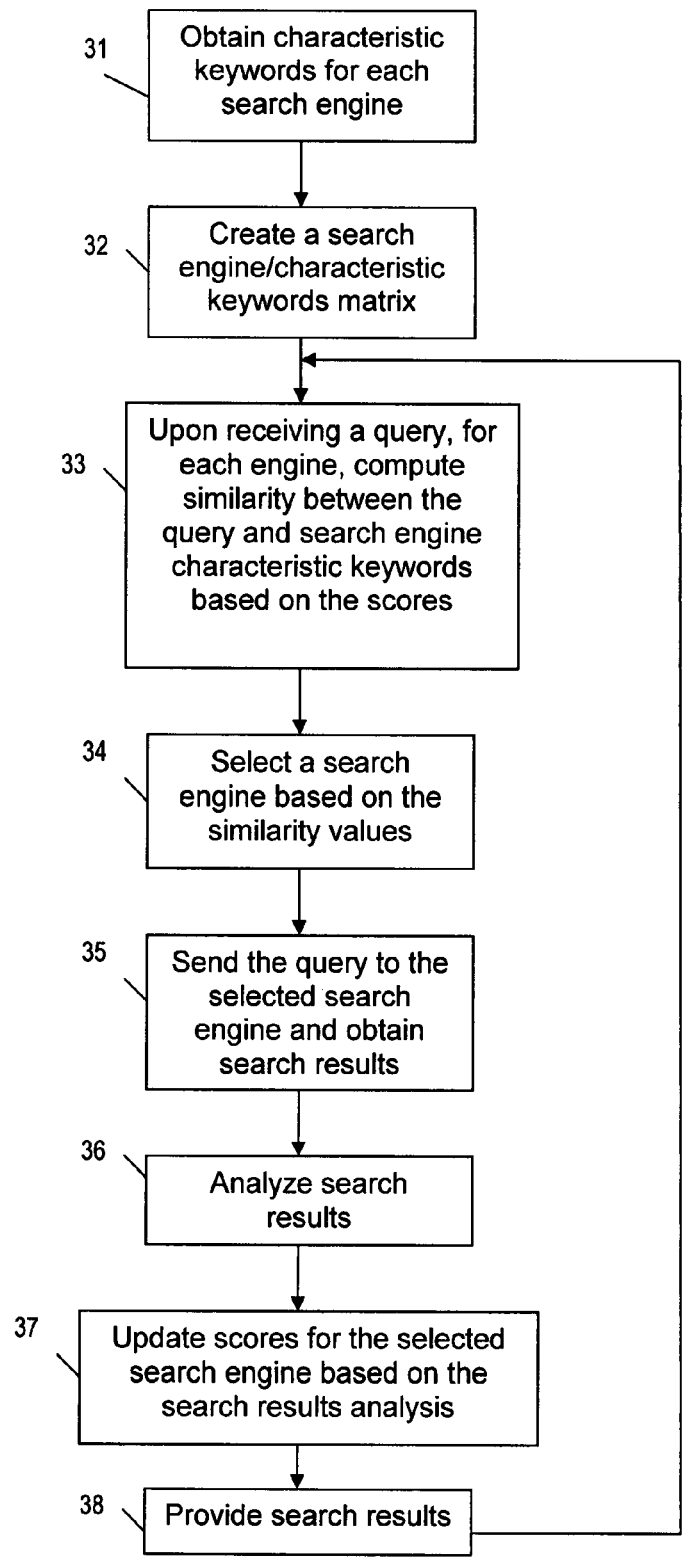
FIG. 3 shows an implementation of a process for selecting a personalized search engine and executing a query for access to information, according to an embodiment of the present invention.

In one implementation, referring to FIG. 3, a process 30 for selecting a personalized search engine and executing a query includes the following overall steps:

Step 31: Obtaining (and/or creating) a list of characteristic keywords representing the capability of each personalized search engine under consideration.

Step 32: Creating a personalized search engine/characteristic keywords scoring matrix including an entry for the score of each characteristic keyword for a personalized search engine (personalized search engine score), where the score for each personalized search engine indicates how well that particular personalized search engine performs searching for a particular characteristic keyword.

Step 33: When a query is issued, computing a similarity between the query keywords and the characteristic keywords for each personalized search engine based on the personalized search engine scores.

Step 34: Selecting the personalized search engine that has the highest similarity.

Step 35: Sending the query to the selected personalized search engine, and obtaining search results.

Step 36: Selecting the top n results of the search results from the selected personalized search engine, and analyzing the text of the results to determine the quality of the results.

Step 37: Updating the scores in the matrix based on quality of the search results, and optionally adding additional (new) characteristic keywords to the matrix for the selected personalized search engine.

Step 38: Providing the search results in response to the query. The process then proceeds back to step 23 to wait for and process the next query.

Referring to Table 1 below, an example of the personalized search engine/characteristic keywords scoring matrix is shown for x>1 personalized search engines and y≥1 characteristic keywords per personalized search engine. Each cell in the matrix is at the intersection of a personalized search engine and a corresponding characteristic keyword, wherein the cell includes a score representing the relevancy of the search result from the personalized search engine for the keyword. The scores are in the form $V_{ij}$, wherein i is the personalized search engine (row) index and j is the keyword (column) index.

TABLE 1

Personalized search engine/characteristic keywords matrix

|  | Keyword 1 | Keyword 2 | Keyword 3 | ... | Keyword y |
|---|---|---|---|---|---|
| Search engine 1 | V11 | V12 | V13 |  | V1y |
| Search engine 2 | V21 | V22 | V23 |  | V2y |
| Search engine 3 | V31 | V32 | V33 |  | V3y |
| ... |  |  |  |  |  |
| Search engine x | Vx1 | Vx2 | Vx3 |  | Vxy |

Figure 4:
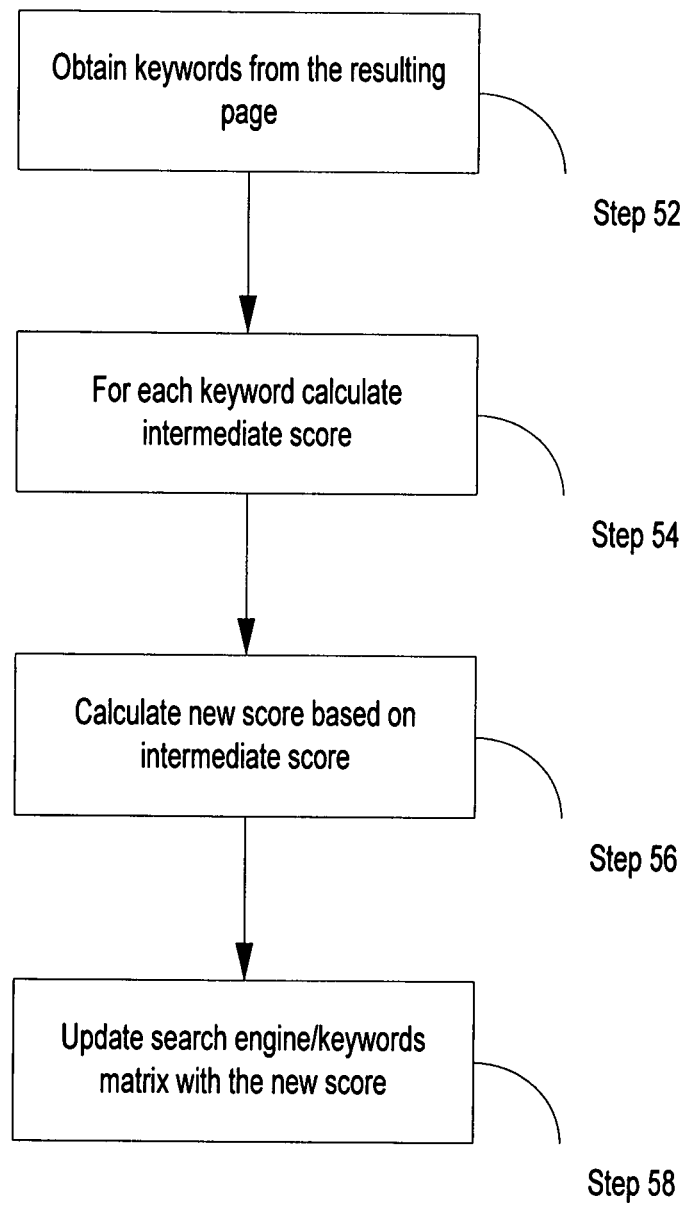
FIG. 4 shows a process for updating the scores in a personalized search engine/characteristic keyword scoring matrix for a selected personalized search engine, based on the search results returned from the personalized search engine for a query, according to an embodiment of the present invention.

FIG. 4 shows a process 50 for updating the scores in a personalized search engine/characteristic keywords scoring matrix (e.g., Table 1) for a selected personalized search engine, based on the search results returned from the personalized search engine for a query. The process 50 includes the steps of:

Step 52: Obtaining keywords from the search results.

Step 54: For each obtained keyword, calculating an intermediate score S.

Step 56: Calculating a new score for the obtained keyword V based on the intermediate score S.

Step 58: In the personalized search engine/keywords matrix, updating the personalized search engine score for the obtained keyword with the new score V.

An implementation of the above steps is now described. Specifically, in step 52 the search results from the selected personalized search engine are obtained as pages, optionally along with linked pages. Obtaining keywords from the search results includes analyzing the search results, such as web pages, to identify existing characteristic keywords for the selected personalized search engine and/or extract new keywords as characteristic keywords for the selected personalized search engine (also, snippets can be analyzed instead of entire web pages, depending on the trade-off between computation time and the quality of the search results).

As such, the obtained keywords may include those characteristic keywords which are already in the matrix (e.g., characteristic Keyword 1, ..., x in Table 1 above) for the selected personalized search engine, and/or additional (new) keywords that can be entered in the matrix as new characteristic keyword entries (along with a score), for the selected personalized search engine.

In step 54, for each obtained keyword as a characteristic keyword for the selected personalized search engine, an intermediate score S is computed based on a weighted sum of frequencies of occurrence of the characteristic keyword in a search results page. In one example, such an intermediate score S is calculated according to equation (1) below:

$$S = \frac{\sum_{i=1}^{m} W_i^R W_i^P W_i^Q (f_i^T + f_i^S + f_i^e + f_i^B)}{\sum_{i=1}^{m} (f_i^T + f_i^S + f_i^e + f_i^B)} \quad (1)$$

wherein $W^R$ is a weighting factor indicating the ranking of the results page returned by the selected personalized search engine in which the keyword occurred; $W^P$ is a weighting factor indicating where the keyword occurred in the results page (e.g., in the title, in the body, and whether it is emphasized); $W^Q$ is a weighting factor indicating whether the keyword is in both the query and the existing characteristic keyword list (e.g., in Table 1) for the selected personalized search engine. Superscripts T, S, B, and E for occurrence frequency f, represent the four (4) positions in a results page (or document) where a keyword can occur: title, subtitle, emphasized body, and non-emphasized body, respectively. The value m represents the number of search results selected for computing the score S, wherein i is the $i^{th}$ page/document in the top m results. Those skilled in the art can choose other types of criteria for the weighting.

Then in step 56, a score is computed for a keyword obtained from the search results returned by the selected personalized search engine for the $n^{th}$ time. An example of calculating such a score can be according to equation (2) below:

$$V_n = aV_{n-1} + bS_n \quad (2)$$

wherein $V_n$ is the keyword score in an entry of the matrix when a personalized search engine is selected for the $n^{th}$ time, $V_{n-1}$ is the keyword score when a personalized search engine is selected for the $(n-1)^{th}$ time, and n is an integer n>1, with 0<a, b<1 (e.g., a=0.8, b=0.2 and $V_1$=1.0), and $S_n$ is the interim keyword score computed according to equation (1) above. In this example, a and b are weighting coefficients based on certain heuristics, for example a=0.9, b=0.1 and a+b=1.0. Generally, a and b are used to incrementally increase/decrease the score of keywords. The larger a is, the slower the incrementing speed is.

Then, in step 58, the matrix (e.g., Table 1) is updated with the new score $V_n$ for an existing characteristic keyword (or a new keyword is added along with a score $V_n$) for the selected personalized search engine.

The computation of S in equation (1) for a personalized search engine and characteristic keyword can yield either a negative value or a positive value. A positive value indicates that a particular personalized search engine characteristic keyword in the query has a higher significance in representing this personalized search engine, while a negative value indicates that the characteristic keyword is less significant than previously expected. A new score for the characteristic keyword is then calculated using equation (2). The goal is for the value of $V_n$ for each matrix entry (i.e., $V_{ij}$ in Table 1) to gradually stabilize while considering changes that might occur to a personalized search engine's capability. Heuristically, and in reality, personalized search engines do not change their coverage of the Web in a short period of time, and it is expected that the significance of a characteristic keyword that represents the capability of a personalized search engine to eventually stabilize to a certain numeric score.

Figure 5:
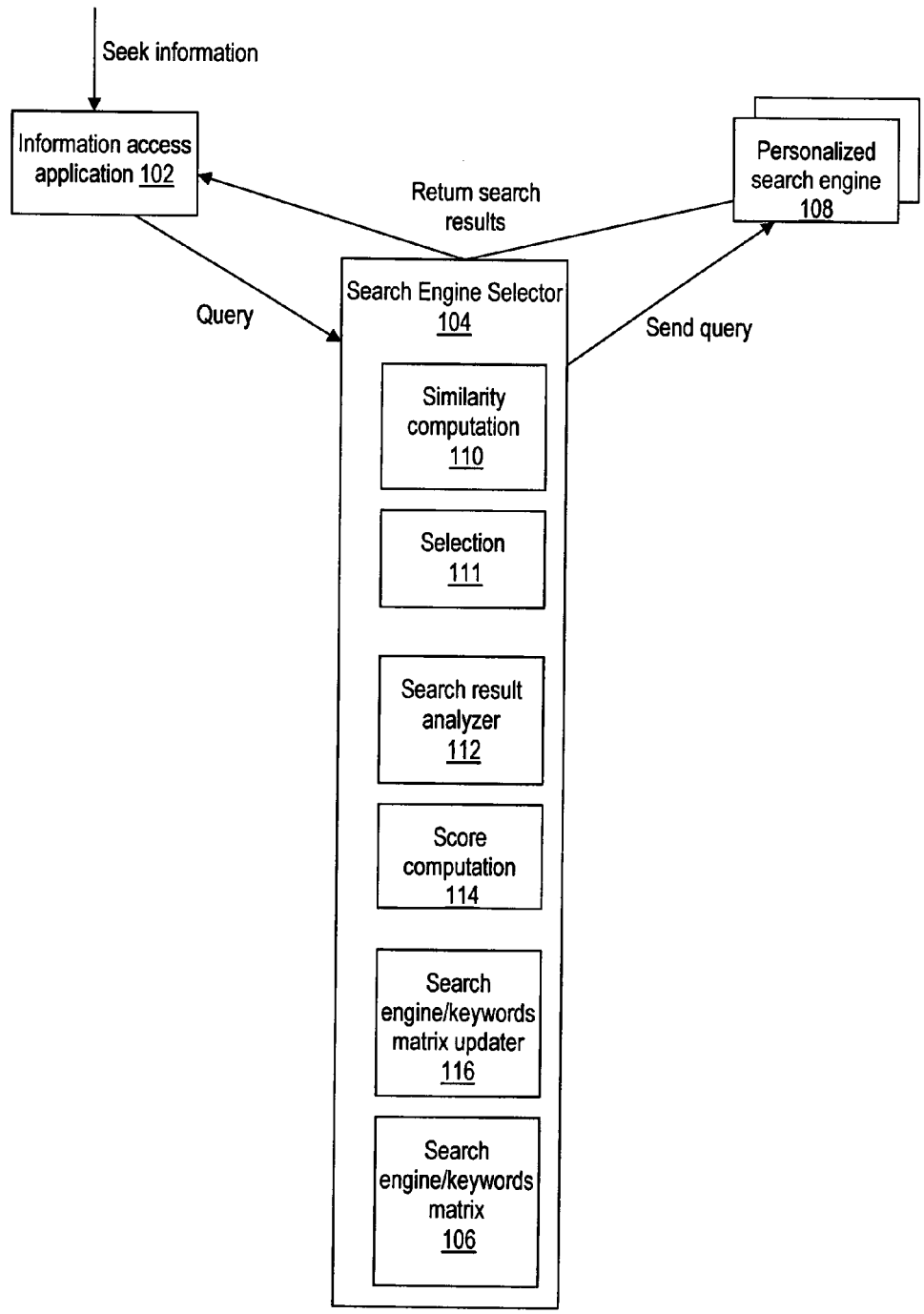
FIG. 5 shows a functional block diagram of another information access architecture, according to an embodiment of the present invention.

FIG. 5 shows a functional block diagram of an information access architecture 100 implementing the above steps, according to an embodiment of the present invention. The architecture 100 involves an information access (seek) application 102, a personalized search engine selector 104, a personalized search engine/keywords matrix 106 and one or more personalized search engines 108.

The information access (seek) application 102 connects to the Internet for access to information. On the Internet, there is at least one personalized search engine 108. The personalized search engine selector 104 maintains the personalized search engine/keywords matrix 106 such as Table 1 above. The personalized search engine selector 104 can be implemented on the same device as the information access application 102 or on a different device.

Figure 6:
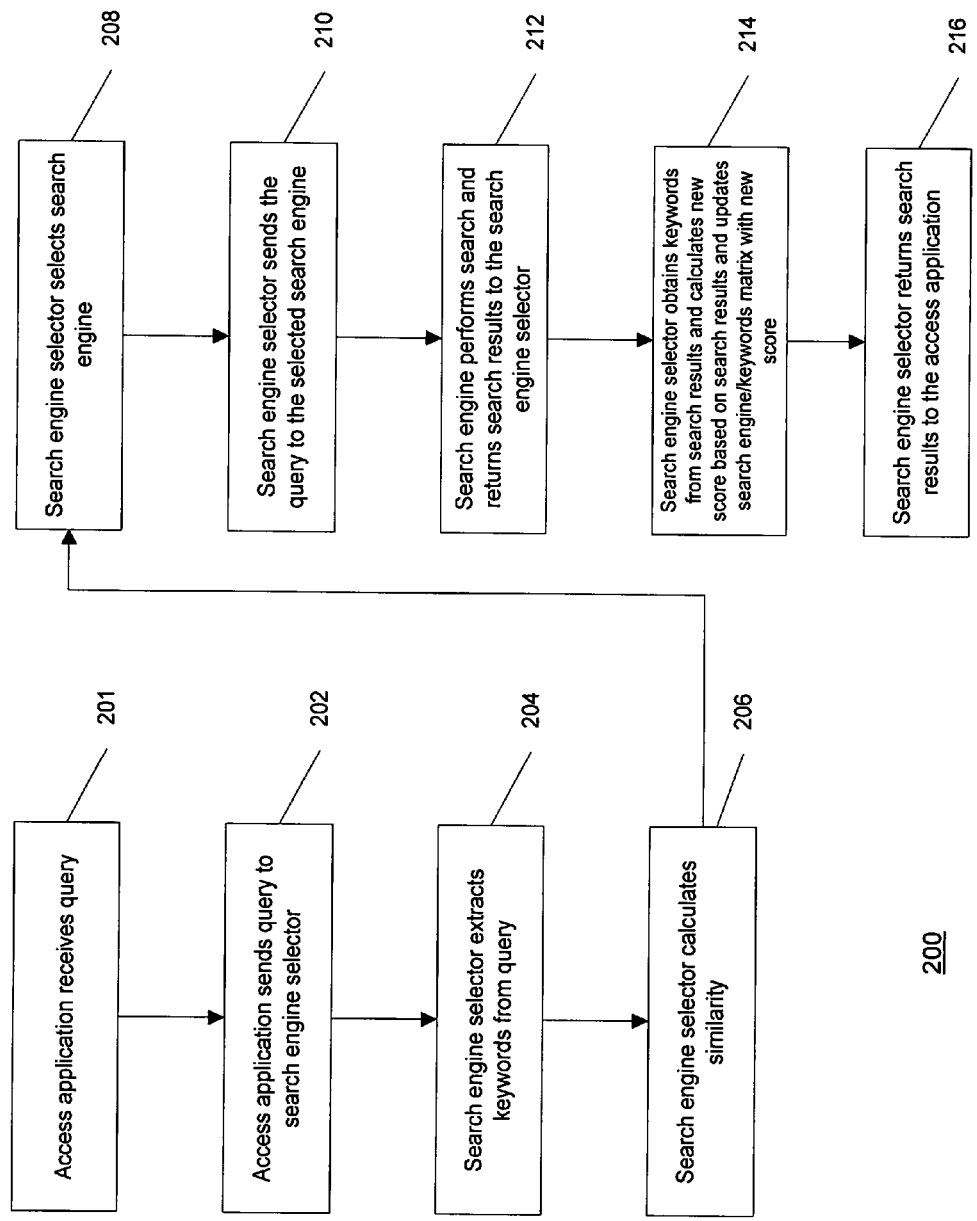
FIG. 6 shows an example information access process for selecting a personalized search engine and executing a query for access to information, according to an embodiment of the present invention.

FIG. 6 shows an example information access process 200 using the architecture 100, according to an embodiment of the present invention. The process 200 includes the following steps:

Step 201: The information access application 102 receives a query (e.g., from a user or by an application) containing query keywords.

Step 202: The information access application 102 sends the query to the personalized search engine selector 104.

Step 204: The query can either be free text or a list of keywords. When the query is free text, the selector 104 may preprocess the query (e.g., remove stop-words such as "is", "what", "where", etc.) to extract keywords from the free text.

Step 206: A similarity computation function 110 calculates similarity between the query keywords and each personalized search engine's characteristic keywords.

Step 208: A selection function 111 determines that a personalized search engine 108 has the highest similarity, and selects that personalized search engine.

Step 210: The personalized search engine selector 104 sends the query to the personalized search engine over the Internet.

Step 212: The personalized search engine sends the search results back to the personalized search engine selector 104 via the Internet.

Step 214: A search result analyzer function 112 processes each search result and obtains keywords from each search result as described above. For each extracted keyword, a score computation function 114 computes the score as described above in relation to FIGS. 3-4, and an updating function 116 updates the matrix 106.

Step 216: The personalized search engine selector 104 then returns the search results back to the information access application 102.

Although in FIG. 5 the search result analyzer function 112, the score computation function 114 and the updating function 116 are shown as part of the personalized search engine selector 104, these and other functions may be implemented separately.

As noted above, upon analysis of the search results from a selected personalized search engine, additional keywords may be added to the personalized search engine/keywords matrix as additional characteristic keywords for that selected personalized search engine. This is because existing characteristic keywords in the personalized search engine/keywords matrix may not cover all topics. For example, a keyword "DVD-A" appearing in a search result, may be a new keyword appearing in the search results during a search for music CDs on a personalized search engine (e.g., utilizing base search engine Shopping.com). As such, the updating function 116 can expand the coverage of the personalized search engine/keywords matrix for each personalized search engine over time.

In this example, DVD-A is added as a new characteristic keyword in the personalized search engine/keywords matrix for Shopping.com, and given a score of 1.0. If a subsequent query includes "DVD-A", the personalized search engine utilizing the base search engine Shopping.com is selected as the search engine for such a query, by cooperative action of the similarity computation and selection functions 110, 111. The score for "DVD-A" in relation to other personalized search engines in the matrix that utilize such base search engines as Medicine.com, Stock.com, etc., would be 0. Based on search results for subsequent queries, the computed score according to equations (1) and (2) above for "DVD-A" may decrease in relation to the personalized search engine using the base search engine Shopping.com. In another example, based on search results for subsequent queries, the computed score according to equations (1) and (2) above for "DVD-A" may increase in relation to the personalized search engines utilizing base search engines such as Medicine.com, Stock.com, etc. Table 2 below shows a numerical example for Table 1 after several queries. Other examples are possible.

TABLE 2

Personalized search engine/characteristic keywords matrix

| | Keyword 1 | Keyword 2 | Keyword 3 | ... | Keyword y |
|---|---|---|---|---|---|
| Search engine 1 | 1.0 | 0 | 0 | | 0 |
| Search engine 2 | 0.5 | 0.3 | 0.2 | | 0.9 |
| Search engine 3 | 1.4 | 2.0 | 0 | | 0.1 |
| ... | | | | | |
| Search engine x | 2.0 | 3.0 | 0.5 | | 0 |

As such, selecting personalized search engines according to the present invention allows searching accuracy that increases with an accumulation of keyword scores per personalized search engine over multiple searches. No special server is required for selecting personalized search engines. For example, a meta search engine on the Internet is unnecessary. Instead, a personalized search engine selector according to the present invention can be implemented on a client device, such as a PC, CE device, mobile device, etc., which receives queries. The present invention further allows extracting personalized search engine characteristic keywords based on search results, even if the description of a personalized search engine is scarce.

Figure 7:
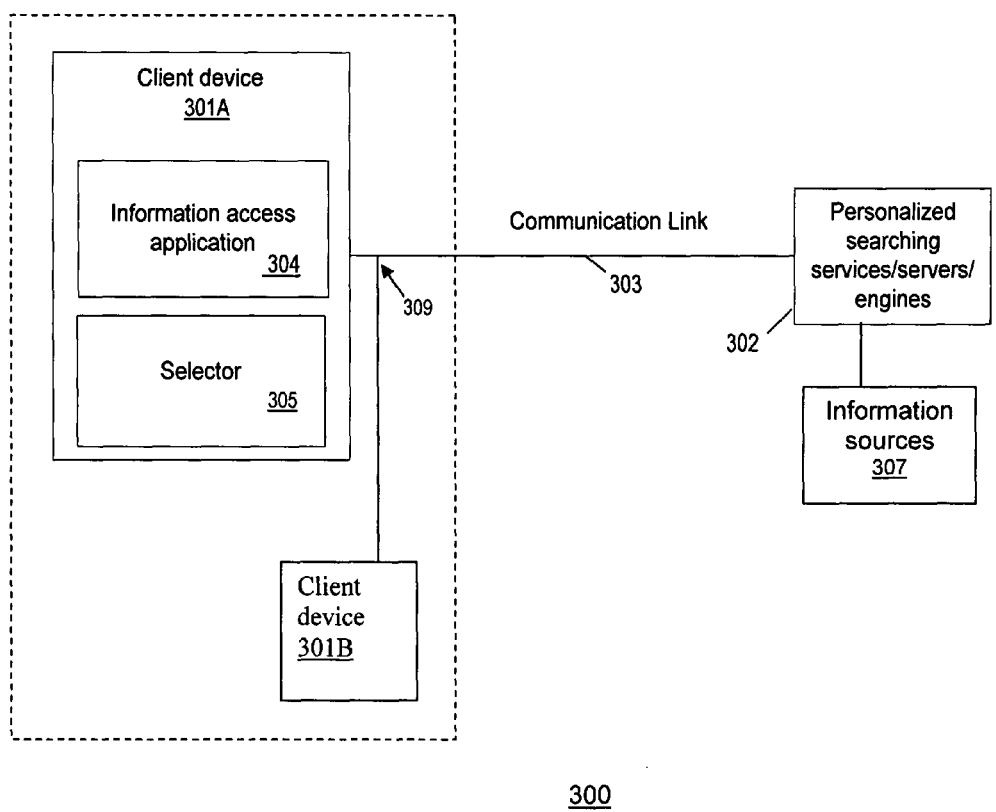
FIG. 7 shows a functional block diagram of another information access architecture, according to an embodiment of the present invention.

Although embodiments of the present invention are described in relation to personalized search engines on the Internet, as shown by an example architecture 300 in FIG. 7 according to the present invention, a selector 305 in a client device 301A is useful for selecting personalized searching services/servers/engines 302 for searching information sources 307 such as databases on other networks besides and/or in addition to the Internet. The selector 305 receives queries from the application 304, selects a searching service/server/engine, and communicates with the selected searching service/server/engine via the communication link 303 for sending queries thereto for execution. In selecting a searching service/server/engine, the selector 305 operates as discussed above. Another client device 301B is also shown, which may include the functionalities of the personalized search engine selection functionalities of the client device 301A. The client devices 301A and 301B may be connected via a local area network (LAN) 309, which connects to the searching services/servers/engines 302 via the communication link 303.

Accordingly, the present invention allows the dynamic selection of a personalized search engine without requiring prior knowledge of a search engine interface (i.e., without scraping the HTML page of a search engine). The present invention further allows free text query without requiring an understanding of the query keywords semantics, thereby reducing computation resource consumption. Nor is there a requirement for a special server, such as a meta search engine. Instead, the present invention can be implemented on client devices such as consumer electronics (CE) devices that can connect to the search engine servers via the Internet. The present invention also enables a user to utilize existing personalized search engines (such as those of other users) instead of creating one's own.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method for providing access to information using personalized search engines, comprising:
    identifying a multiplicity of personalized search engines, wherein each personalized search engine performs searches using at least two base search engines, and wherein one or more of the personalized search engines include different combinations of base search engines;
    obtaining characteristic information for each personalized search engine, wherein characteristic information for a personalized search engine includes one or more characteristic keywords representing searching capabilities of said personalized search engine; and
    dynamically selecting a personalized search engine among the multiple personalized search engines for executing a query based on characteristic information for each personalized search engine and the query;
    wherein characteristic information for the selected personalized search engine is updated based on one or more keywords extracted from search results returned by the selected personalized search engine; and
    wherein dynamically selecting a personalized search engine comprises:
        for each personalized search engine, determining a similarity between one or more user entered query keywords and characteristic information for the personalized search engine; and
        selecting a personalized search engine based on each similarity determined.

2. The method of claim 1, wherein:
    each personalized search engine is created by a user to perform searches using at least two user-selected, base search engines;
    said one or more personalized search engines are created by different users;
    a first plurality of the characteristic keywords associated with each personalized search engine have been directly selected by a user who created the personalized search engine; and
    obtaining characteristic information for each personalized search engine further includes determining characteristic information for said personalized search engine based on search results retrieved by said personalized search engine through its base search engines.

3. The method of claim 2, wherein obtaining characteristic information for each personalized search engine further includes determining characteristic information for said personalized search engine based on personalization information for each base search engine represented by said personalized search engine.

4. The method of claim 1, wherein dynamically selecting a personalized search engine further includes selecting a personalized search engine with the highest similarity.

5. The method of claim 1, further comprising:
    causing execution of the query on the selected personalized search engine;
    obtaining search results retrieved by the selected personalized search engine upon execution of the query;
    extracting one or more keywords from the search results;
    updating the characteristic information for the selected personalized search engine based on at least one of: information identifying where each extracted keyword occurred within the search results, and ranking of each search result that includes at least one of the one or more extracted keywords; and
    providing the search results in response to the query.

6. The method of claim 1, further comprising:
    causing execution of the query on the selected personalized search engine;
    obtaining search results retrieved by the selected personalized search engine upon execution of the query;
    analyzing quality of the search results based on one or more of the query and characteristic information for the selected personalized search engine; and
    scoring the selected personalized search engine based on the quality of the search results.

7. The method of claim 6, wherein scoring the selected personalized search engine includes:
    determining a weighted sum of frequencies of occurrence of one or more characteristic keywords representing searching capabilities of the selected personalized search engine in the search results; and
    scoring the selected personalized search engine based on said weighted sum of frequencies.

8. The method of claim 6, wherein scoring the selected personalized search engine further includes accumulating scores over multiple searches for the selected personalized search engine as a function of the quality of the search results for subsequent queries based on the characteristic information.

9. The method of claim 6, wherein selecting a personalized search engine further includes determining a similarity between the query and characteristic information for each personalized search engine based on corresponding scores for each personalized search engine.

10. The method of claim 6, further including creating a personalized search engine and keyword matrix that accumulates scores over multiple searches.

11. The method of claim 1, wherein the multiple personalized search engines are implemented on one or more servers and selecting a personalized search engine is performed by a client.

12. The method of claim 11, wherein said one or more servers are implemented on the Internet and the client connects to the Internet for communicating with the multiple personalized search engines.

13. The method of claim 1, further comprising:
personalizing a search engine using keywords provided by a user for each base search engine;
wherein each personalized search engine is created by a user to perform searches using at least two user-selected, base search engines;
wherein said one of more of the personalized search engines are personalized by different users;
wherein a first plurality of the characteristic keywords associated with each personalized engine having been directly selected by a user who created the personalized search engine; and
wherein the free text query is received from a user.

14. The method of claim 1, further comprising:
obtaining characteristic information for each personalized search engine based on search results retrieved by said personalized search engine through its base search engines.

15. The method of claim 1, further comprising:
obtaining characteristic information for each personalized search engine comprises determining one or more characteristic keywords representing searching capabilities of each base search engine of said personalized search engine.

16. The method of claim 1, further comprising:
calculating a score value for each characteristic keyword;
receiving a query that includes one or more query keywords; and
calculating, based on at least some of the score values, a similarity value for each personalized search engine indicative of a similarity between the query and at least some of the characteristic keywords,
wherein selecting a personalized search engine is based at least partly on similarity values.

17. The method of claim 16, further comprising:
maintaining separate score values for each characteristic keyword across the multiple personalized search engines.

18. The method of claim 17, wherein each characteristic keyword is directly created by a user and is not automatically generated by a search engine.

19. The method of claim 1, further comprising:
providing a score for each characteristic keyword indicative of a searching capability of a personalized search engine for the characteristic keyword;
executing a query that includes one or more query keywords;
retrieving search results in response to the query; and
updating the score values based on the retrieved search results wherein the updating comprises:
obtaining a second multiplicity of characteristic keywords from the search results;
calculating an intermediate score value for each of the second multiplicity of characteristic keywords, the intermediate score values collectively indicating frequency of appearance of the second multiplicity of keywords in the search results;
calculating a new score value for each characteristic keyword indicative of a searching capability of a personalized search engine based on at least one of the intermediate scores; and
updating the score values for each characteristic keyword indicative of a searching capability of a personalized search engine using the new score values.

20. The method of claim 19, wherein some but not all of the keywords in the second multiplicity of characteristic keywords match and are identical to keywords in the first multiplicity of keywords, and wherein the non-matching keywords are maintained as part of characteristic information with new score values.

21. The method of claim 1, wherein:
a second plurality of the characteristic keywords associated with each personalized search engine are automatically selected from a FAQ/about web page that is associated with and gives an introduction to one base search engine of said personalized search engine.

22. The method of claim 21, wherein:
a third plurality of the characteristic keywords associated with each personalized search engine are selected by a user to describe only one base search engine of said personalized search engine, rather than said personalized search engine as a whole.

23. The method of claim 1, wherein the selecting of the personalized search engine is performed without executing a query through any of the multiple personalized search engines.

24. A system for providing access to information using personalized search engines, comprising:
an information module configured for maintaining characteristic information for each personalized search engine, wherein characteristic information for a personalized search engine includes one or more characteristic keywords representing searching capabilities of said personalized search engine, wherein each personalized search engine represents at least two base search engines, and wherein one or more of the personalized search engines include different combinations of base search engines; and
a hardware client device including:
a similarity computation processor configured for determining a similarity between a query including one or more query keywords and characteristic information for each personalized search engine; and
a selector including a selection processor configured for dynamically selecting a personalized search engine among the multiple personalized search engines for executing the query based on similarities;
wherein characteristic information for the selected personalized search engine is updated based on one or more keywords extracted from search results returned by the selected personalized search engine; and
wherein dynamically selecting a personalized search engine comprises:
for each personalized search engine, determining a similarity between one or more user entered query keywords and characteristic information for the personalized search engine; and
selecting a personalized search engine based on each similarity determined.

25. The system of claim 24, wherein:
each personalized search engine is personalized by a user to represent at least two user-selected base search engines;
said one or more of the personalized search engines are personalized by different users; and a first plurality of the characteristic keywords associated with each personalized search engine have been directly selected by a user who personalized the personalized search engine; and characteristic information for each personalized search engine further includes characteristic information for said personalized search engine based on search results retrieved by said personalized search engine through its base search engines.

26. The system of claim 25, wherein characteristic information for each personalized search engine further includes characteristic information for said personalized search engine based on personalization information for each base search engine represented by said personalized search engine.

27. The system of claim 26, wherein characteristic information for each personalized search engine further includes one or more characteristic keywords representing searching capabilities of each base search engine of said personalized search engine.

28. The system of claim 27, wherein the selector is further configured for selecting a personalized search engine with the highest similarity.

29. The system of claim 27, further comprising an application module configured for receiving the query, wherein the selector is further configured for causing execution of the query on the selected personalized search engine.

30. The system of claim 29, wherein the selector is further configured for:
obtaining search results retrieved by the selected personalized search engine upon execution of the query;
extracting one or more keywords from the search results;
updating the characteristic information for the selected personalized search engine based on at least one of: information identifying where each extracted keyword occurred within the search results, and the ranking of each search result that includes at least one of the one or more extracted keywords; and
providing the search results in response to the query.

31. The system of claim 29, wherein the selector further includes an analyzer configured for analyzing quality of the search results based on one or more of the query and characteristic information for the selected personalized search engine; and
a scoring module configured for scoring the selected personalized search engine based on the quality of the search results.

32. The system of claim 31, wherein the scoring module is further configured for scoring the selected personalized search engine by determining a weighted sum of frequencies of occurrence of one or more characteristic keywords representing searching capabilities of the selected personalized search engine in the search results, and scoring the selected personalized search engine based on said weighted sum of frequencies.

33. The system of claim 31, wherein the selector further includes an updating module configured for accumulating scores over multiple searches for each selected personalized search engine as a function of the quality of the search results for subsequent queries based on the characteristic information.

34. The system of claim 33, wherein the selector is further configured for selecting a personalized search engine based on the query and accumulated scores for each personalized search engine.

35. The system of claim 31, wherein the similarity computation module is further configured for determining a similarity between the query and characteristic information for each personalized search engine based on corresponding scores for each personalized search engine.

36. The system of claim 35, wherein the selection module is further configured for selecting a personalized search engine based on corresponding scores for each personalized search engine.

37. A client module for providing access to information using personalized search engines, comprising:
an application module for receiving a query; and
a hardware processor configured by a selector configured for dynamically selecting a personalized search engine among a multiplicity of personalized search engines for executing a query based on characteristic information for each personalized search engine and the query;
wherein dynamically selecting a personalized search engine comprises:
for each personalized search engine, determining a similarity between one or more user entered query keywords and characteristic information for the personalized search engine; and
selecting a personalized search engine based on each similarity determined;
wherein each personalized search engine performs searches using at least two base search engines;
wherein one or more of the personalized search engines include different combinations of base search engines;
wherein characteristic information for a personalized search engine includes one or more characteristic keywords that represent searching capabilities of said personalized search engine; and
wherein characteristic information for the selected personalized search engine is updated based on one or more keywords extracted from search results returned by the selected personalized search engine.

38. The client module of claim 37, wherein:
each personalized search engine is created by a user to perform searches using at least two user-selected, base search engines;
said one or more of the personalized search engines are personalized by different users;
a first plurality of the characteristic keywords associated with each personalized engine have been directly selected by a user who created the personalized search engine; and
characteristic information for each personalized search engine further includes characteristic information for said personalized search engine based on search results retrieved by said personalized search engine through its base search engines.

39. The client module of claim 38, wherein characteristic information for each personalized search engine further includes characteristic information for said personalized search engine based on personalization information for each base search engine represented by said personalized search engine.

40. The client module of claim 38, wherein the multiple personalized search engines are implemented on one or more servers such that a client is configured for communicating with the one or more servers via a communication link.

41. The client module of claim 40, wherein the one or more servers are implemented on the Internet and the client is configured for connecting to the Internet for communicating with the multiple personalized search engines.

42. The client module of claim 37, wherein the selector includes a similarity computation module configured for determining a similarity between one or more query keywords of the query and characteristic information for each personalized search engine, and a selection module configured for selecting a personalized search engine based on similarities.

43. The client module of claim 42, wherein the selection module is further configured for selecting a personalized search engine with the highest similarity.

44. The client module of claim 37, wherein the selector is further configured for causing execution of the query on the selected personalized search engine.

45. The client module of claim 44, wherein the selector is further configured for:
obtaining search results retrieved by the selected personalized search engine upon execution of the query;
extracting one or more keywords from the search results;
updating the characteristic information for the selected personalized search engine based on at least one of: information identifying where each extracted keyword occurred within the search results, and the ranking of each search result that includes at least one of the one or more extracted keywords; and
providing the search results in response to the query.

46. The client module of claim 44, wherein the selector further includes:
an analyzer configured for analyzing quality of the search results based on one or more of the query and characteristic information for the selected personalized search engine; and
a scoring module configured for scoring the selected personalized search engine based on the quality of the search results.

47. The client module of claim 46, wherein the scoring module is further configured for scoring the selected personalized search engine by determining a weighted sum of frequencies of occurrence of one or more characteristic keywords representing searching capabilities of the selected personalized search engine, and scoring the selected personalized search engine based on said weighted sum of frequencies.

48. The client module of claim 46, wherein the selector further includes an updating module configured for accumulating scores over multiple searches for each selected personalized search engine as a function of the quality of the search results for subsequent queries based on the characteristic information.

49. The client module of claim 48, wherein the selector is further configured for selecting a personalized search engine based on the query and accumulated scores for each personalized search engine.

50. The client module of claim 49, wherein the selection module is further configured for selecting a personalized search engine based on corresponding scores for each personalized search engine.

51. The client module of claim 48, wherein the updating module is further configured for obtaining an intermediate score based on the weighted sum of frequencies of occurrences.

52. The client module of claim 51, wherein the updating module is further configured for calculating a new score based on the weighted sum of the intermediate score and the accumulated scores.

53. The client module of claim 46, wherein the similarity computation module is further configured for determining a similarity between the query and characteristic information for each personalized search engine based on corresponding scores for each personalized search engine.

54. A method for providing access to information using personalized search engines, comprising:
creating a list of a multiplicity of personalized search engines, wherein each personalized search engine performs searches using at least two base search engines, and wherein one or more of the personalized search engines include different combinations of base search engines;
obtaining characteristic information for each personalized search engine, wherein characteristic information for a personalized search engine includes one or more characteristic keywords representing searching capabilities of said personalized search engine;
creating a personalized search engine and characteristic keyword matrix that accumulates scores over multiple searches;
receiving a free text query;
determining a similarity between one or more query keywords of the free text query and characteristic information for each personalized search engine based on corresponding scores for each personalized search engine;
dynamically selecting a personalized search engine among the multiplicity of personalized search engines for executing the free text query based on similarity;
sending the free text query to the selected personalized search engine;
obtaining search results from the selected personalized search engine;
analyzing the search results;
updating corresponding scores for the selected personalized search engine based on the search results analysis; and
providing the search results;
wherein characteristic information for the selected personalized search engine is updated based on one or more keywords extracted from search results returned by the selected personalized search engine; and
wherein dynamically selecting a personalized search engine comprises:
for each personalized search engine, determining a similarity between one or more user entered query keywords and characteristic information for the personalized search engine; and
selecting a personalized search engine based on each similarity determined.

55. A computer program product comprising a processor usable medium having processor readable program code embodied therewith, wherein the processor readable program when executed on the processor causes the processor to perform operations comprising:
identifying a multiplicity of personalized search engines, wherein each personalized search engine performs searches using at least two base search engines, wherein one or more of the personalized search engines include different combinations of base search engines;
maintaining characteristic information for each personalized search engine, wherein characteristic information for a personalized search engine includes one or more characteristic keywords representing searching capabilities of said personalized search engine;
receiving one or more query keywords for a query;
determining a similarity between said one or more query keywords and characteristic information for each personalized search engine; and
dynamically selecting a personalized search engine among the multiple personalized search engines for executing a query based on similarities;
wherein characteristic information for the selected personalized search engine is updated based on one or more keywords extracted from search results returned by the selected personalized search engine; and wherein dynamically selecting a personalized search engine comprises:

for each personalized search engine, determining a similarity between one or more user entered query keywords and characteristic information for the personalized search engine; and selecting a personalized search engine based on each similarity determined.

* * * * *